United States Patent
Innanje et al.

(10) Patent No.: US 11,756,240 B2
(45) Date of Patent: Sep. 12, 2023

(54) PLUGIN AND DYNAMIC IMAGE MODALITY RECONSTRUCTION INTERFACE DEVICE

(71) Applicant: Shanghai United Imaging Intelligence Co., LTD., Shanghai (CN)

(72) Inventors: Arun Innanje, Cambridge, MA (US); Shanhui Sun, Cambridge, MA (US); Abhishek Sharma, Cambridge, MA (US); Zhang Chen, Cambridge, MA (US); Ziyan Wu, Cambridge, MA (US)

(73) Assignee: Shanghai United Imaging Intelligence Co., LTD., Shanghai (CN)

( * ) Notice: Subject to any disclaimer, the term of this patent is extended or adjusted under 35 U.S.C. 154(b) by 449 days.

(21) Appl. No.: 16/804,985

(22) Filed: Feb. 28, 2020

(65) Prior Publication Data
US 2021/0272332 A1    Sep. 2, 2021

(51) Int. Cl.
*G06T 19/20* (2011.01)
*G06T 11/00* (2006.01)
*G06T 1/20* (2006.01)

(52) U.S. Cl.
CPC .............. *G06T 11/005* (2013.01); *G06T 1/20* (2013.01); *G06T 19/20* (2013.01); *G06T 2207/10081* (2013.01); *G06T 2207/10088* (2013.01); *G06T 2207/10104* (2013.01); *G06T 2207/30004* (2013.01)

(58) Field of Classification Search
CPC ............... G06T 2210/41; G06T 7/0012; G06T 2207/10072; G06T 2207/10081; G06T 5/001; G06T 2207/10116; G06T 2207/30004; G06K 2209/05
See application file for complete search history.

(56) References Cited

U.S. PATENT DOCUMENTS

| | | | | |
|---|---|---|---|---|
| 6,574,304 B1* | 6/2003 | Hsieh | ..................... | A61B 6/032 378/62 |
| 2003/0139944 A1* | 7/2003 | Carlsen | ................. | G16H 10/60 382/128 |
| 2005/0100201 A1* | 5/2005 | Mayer | ..................... | G16H 40/63 382/128 |
| 2005/0113960 A1* | 5/2005 | Karau | ..................... | A61B 6/032 700/182 |
| 2005/0251006 A1* | 11/2005 | Dellis | ..................... | G16H 30/20 600/407 |
| 2006/0123266 A1* | 6/2006 | Matsumoto | .......... | G06Q 20/102 714/1 |
| 2006/0242144 A1* | 10/2006 | Esham | ................... | G16H 30/20 |
| 2007/0008172 A1* | 1/2007 | Hewett | ................. | A61B 6/465 340/870.38 |

(Continued)

*Primary Examiner* — Guillermo M Rivera-Martinez
(74) *Attorney, Agent, or Firm* — Ziegler IP Law Group

(57) ABSTRACT

A standalone image reconstruction device is configured to reconstruct the raw signals received from a radiology scanner device into a reconstructed output signal. The image reconstruction device is a vendor neutral interface between the radiology scanner device and the post processing imaging device. The reconstructed output signal is a user readable domain that can be used to generate a medical image or a three-dimensional (3D) volume. The apparatus is configured to reconstruct signals from different types of radiology scanner devices using any suitable image reconstruction protocol.

20 Claims, 8 Drawing Sheets

(56) References Cited

U.S. PATENT DOCUMENTS

| | | | | |
|---|---|---|---|---|
| 2007/0050759 | A1* | 3/2007 | Boing | G16H 40/40 |
| | | | | 717/135 |
| 2007/0276214 | A1* | 11/2007 | Dachille | G16H 30/40 |
| | | | | 600/407 |
| 2009/0138318 | A1* | 5/2009 | Hawkins | G06Q 10/06 |
| | | | | 705/7.27 |
| 2013/0066198 | A1* | 3/2013 | Grant | A61B 6/507 |
| | | | | 600/428 |
| 2013/0131422 | A1* | 5/2013 | Vosniak | A61B 6/037 |
| | | | | 600/1 |
| 2013/0265045 | A1* | 10/2013 | Xu | G01R 33/56383 |
| | | | | 324/309 |
| 2014/0029818 | A1* | 1/2014 | McCoy | G06T 11/003 |
| | | | | 382/131 |
| 2015/0199121 | A1* | 7/2015 | Gulaka | A61B 6/032 |
| | | | | 715/771 |
| 2016/0098833 | A1* | 4/2016 | Tsadok | G06K 9/6201 |
| | | | | 382/103 |
| 2018/0038969 | A1* | 2/2018 | McCollough | A61B 6/4241 |
| 2019/0333254 | A1* | 10/2019 | Lyu | G06T 7/11 |
| 2020/0003857 | A1* | 1/2020 | Weese | G01R 33/58 |
| 2020/0066006 | A1* | 2/2020 | Dwivedi | G06T 11/005 |

* cited by examiner

PLUGIN AND DYNAMIC IMAGE MODALITY RECONSTRUCTION INTERFACE DEVICE

TECHNICAL FIELD

The aspects of the present disclosure relate generally to radiology image reconstruction and more particularly to a stand-alone radiology image reconstruction device.

BACKGROUND

The process of scanning a patient using a radiology scanner like computed tomography (CT), magnetic resonance (MR) imaging, and positron emission tomography (PET) involves the reconstruction of one or more signals acquired from the radiology scanner device to recognizable images. This post processing is typically done using a separate machine that is connected to the radiology scanner device. Radiology is the medical discipline that uses medical imaging to diagnose and treat diseases within the bodies of both humans and animals Radiology scanners from different vendors produce different quality of images depending on the reconstruction algorithm used. The process of reconstruction, which converts the signals from the radiology scanners into signals that can be used to produce images, involve highly optimized algorithms that requires heavy computation resources like memory, central processing units (CPU) and graphics processing units (GPU). Hardware on the post processing machines use to generate the images from the reconstructed signals are evolving more rapidly when compared to the radiology scanner itself. Upgrading the hardware on a regular basis poses considerable challenges as the post processing machine will have a multitude of software precompiled for the specific hardware and operating system.

This leads to the problem that the advances in the innovation in reconstruction imaging cannot make it to the end customers on a fast and regular basis. Also, not all vendors of radiology scanning devices are capable of developing the advanced algorithms required to provide the advanced images. Thus, the quality of images generated by small vendors cannot be matched by large and other third party vendors and providers.

Radiology scanner device manufacturers typically make the post processing device in house, also referred to as an image reconstruction machine, available as part of the delivery of the scanner apparatus. However, the typical post processing device has a multitude of applications running on it, of which image reconstruction is just one part. Since the image reconstruction algorithm in this type of post processing device shares resources against other competing software, not all resources are available for image reconstruction. These applications are also proprietary in nature and not interoperable between radiology scanners of different manufacturers. Most of the post processing devices have high end computation graphics card, since the nature of these image reconstruction algorithms are computationally heavy on GPUs.

Accordingly, it would be desirable to be able to provide an image reconstruction device that addresses at least some of the problems identified above.

SUMMARY

The aspects of the disclosed embodiments are directed to an image reconstruction device, also referred to as an edge device, as a hardware-software solution that is configured to reconstruct the raw signals received from the radiology scanner device into a reconstructed output signal that can be used to generate a high quality medical image. The image reconstruction device is configured to reconstruct signals from different types of radiology scanning devices, such as CT, MR, PET machines, into specific modality images. This object is solved by the subject matter of the independent claims. Further advantageous modifications can be found in the dependent claims.

According to a first aspect the above and further objects and advantages are obtained by an apparatus. In one embodiment, the apparatus includes at least one processor. The at least one processor is configured to receive an input signal from a radiology scanner device, detect a type of a post processing imaging device connected to the apparatus, reconstruct the input signal from the radiology scanner device into a format corresponding to the detected type of post processing imaging device and output the reconstructed input signal to the post processing imaging device. The aspects of the disclosed embodiments provide a stand-alone, self-contained, edge device that can be used to reconstruct raw radiology image data from any radiology scanner device into a reconstructed output signal that corresponds to a type of image reconstruction device that is connected to the edge device. The edge device of the disclosed embodiments is a pre-built reconstruction device that can be readily integrated to and between any radiology scanner device and a post processing image device.

In a possible implementation form of the apparatus the radiology scanning device is one or more of a tomography (CT), magnetic resonance (MR) imaging, and positron emission tomography (PET) image scanning device.

In a possible implementation form of the apparatus the input signal received from the radiology scanner device corresponds to a single slice signal or a time series of a same slice signal and the reconstructed output signal comprises one or more two dimensional image signals reconstructed from the input signal.

In a possible implementation form of the apparatus, the apparatus is configured to reconstruct the input signal into a format corresponding to one or more of a Radiology Information format supported by System (RIS), a Picture Archive and Communication System (PACS), an Image Reading System and a multi-modality workstation. The apparatus of the disclosed embodiments is interoperable with any type of radiology scanner device.

In a possible implementation form of the apparatus, the apparatus comprises a computation enabled device which has hardware and software components that can convert the input signal from the radiology scanner device to a user readable domain like Image or 3D volume.

In a possible implementation form of the apparatus, the apparatus comprises a low end computation device with a low end GPU.

In a possible implementation form of the apparatus the low end GPU computation device comprises devices such as Nvidia Jetson Nano™, Nvidia Jetson TX2™, or Nvidia Jetson Xavier™ devices.

In a possible implementation form of the apparatus, the apparatus comprises a high end computation card.

In a possible implementation form of the apparatus the high end computation card comprises devices such as Nvidia Tesla P400™, Nvidia Tesla V100™, Nvidia Tesla P100™ devices.

In a possible implementation form of the apparatus, the apparatus comprises central processing unit (CPU) devices and deep learning (DL) optimized devices such as the Intel Movidius™ stick.

In a possible implementation form of the apparatus, the apparatus can be internally configured as a cluster on GPUs, CPUs, but exposed as a single device for external communication.

In a possible implementation form of the apparatus, the apparatus works as a pluggable module and can be easily replaced or upgraded to new hardware-software versions.

In a possible implementation form of the apparatus, the apparatus runs a multitude of reconstruction services that are exposed via a standard interface to the connecting radiology scanner device, which includes representational state transfer (REST), remote procedure calls (gRPC) or low-level message queues.

In a possible implementation form of the apparatus, the apparatus is vendor neutral and is configured to accept the input data and a corresponding reconstruction protocol from any radiology scanner device and generate reconstructed output signals configured to generate images specific to the modality.

In a possible implementation form of the apparatus, the apparatus is configured to automatically upgrade the reconstruction services via a connected network.

In a possible implementation form of the apparatus, the apparatus can work as an owned module or a subscription service where there is price charged for reconstructed patient data.

In a possible implementation form of the apparatus, the apparatus can be interfaced with portable scanners, such as a portable magnetic resonance imagining (MRI) device, but not limited to the same.

According to a second aspect the above and further objects and advantages are obtained by a method. In one embodiment, the method includes receiving an input signal from a radiology scanner device, detecting a type of a post processing imaging device connected to the apparatus, reconstructing the input signal from the radiology scanner device into a format corresponding to the detected type of post processing imaging device and outputting the reconstructed input signal to the post processing imaging device. The aspects of the disclosed embodiments provide a stand-alone, self-contained, edge device that can be used to reconstruct raw radiology image data from any radiology scanner device into a reconstructed output signal that corresponds to a type of post processing image device that is connected to the edge device. The edge device of the disclosed embodiments is a pre-built reconstruction device that can be readily integrated to and between any radiology scanner device and a post processing image device.

According to a third aspect the above and further objects and advantages are obtained by a computer program product. In one embodiment, the computer program product includes a non-transitory computer readable media having stored thereon program instructions that when executed by a processor causes the processor to perform the method according to any one of the possible implementation forms recited herein.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which.

DETAILED DESCRIPTION OF THE DISCLOSED EMBODIMENTS

Figure 1:
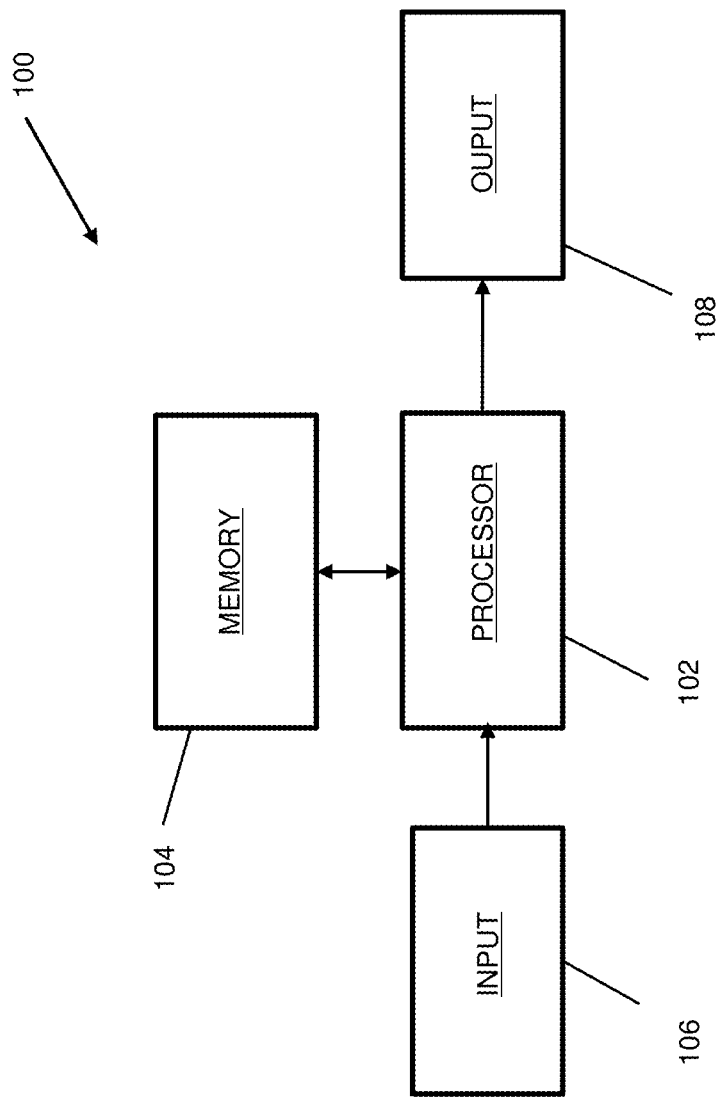
FIG. 1 illustrates a schematic block diagram of an exemplary apparatus incorporating aspects of the disclosed embodiments.

Referring to FIG. 1, a schematic block diagram of an exemplary apparatus 100 incorporating aspects of the disclosed embodiments is illustrated. The aspects of the disclosed embodiments are directed to an image reconstruction device, also referred to as an edge device, as a hardware-software solution that is configured to reconstruct the raw signals received from a radiology scanner device into an output signal. The reconstructed output signal is a user readable domain that can be used to generate a medical image or a three-dimensional (3D) volume. The image reconstruction device of the disclosed embodiments is interoperable with and configured to reconstruct signals from different types of radiology scanner devices into specific modality images. Examples of such scanner devices can include, but are not limited to, tomography (CT), magnetic resonance (MR) imaging, and positron emission tomography (PET).

As is illustrated in FIG. 1, in one embodiment, the apparatus 100, also referred to as a device herein, includes at least one processor 102 and a corresponding memory 104 for storing one or more programs which are executable by the processor 102 for performing the methods described herein. The apparatus 100 also includes at least one input device 106 for receiving input data and at least one output device 108 for outputting data. In one embodiment, the input device 106 is configured to receive raw image data signals from a radiology scanner device as will be further described herein. The output device 108 is configured to output or transmit reconstructed image data to one or more post processing image devices as will be further described herein. In alternate embodiments, the apparatus 100 can include any other devices or components suitable for interfacing between different types of radiology scanner devices and different types of post processing image devices.

Examples of the processor 102 includes, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Optionally, the processor 102 may be one or more individual processors, processing devices and various elements associated with a processing device that may be shared by other processing devices. Additionally, the one or more individual processors, processing devices and elements are arranged in various architectures for responding to and processing the instructions that drive the apparatus 100.

In one embodiment, one or more of the input module 106 and/or the output module 108 can include one or more communication networks or modules to enable communication and the transfer of information to and from the apparatus 100. The communication network may be a wired or wireless communication network. Examples of the communication network may include, but are not limited to, a Wireless Fidelity (Wi-Fi) network, a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), a Metropolitan Area Network (MAN), and/or the Internet. Exemplary communication protocols can include wired and wireless communication protocols, such as but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols, including variants thereof.

The memory 104 can generally comprise suitable logic, circuitry, interfaces, and/or code that may be configured to store instructions executable by the processor 102. Exemplary implementations of the memory 104 may include, but are not limited to, Random Access Memory (RAM), Read Only Memory (ROM), Hard Disk Drive (HDD), Flash memory, and/or a Secure Digital (SD) card. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

Figure 2:
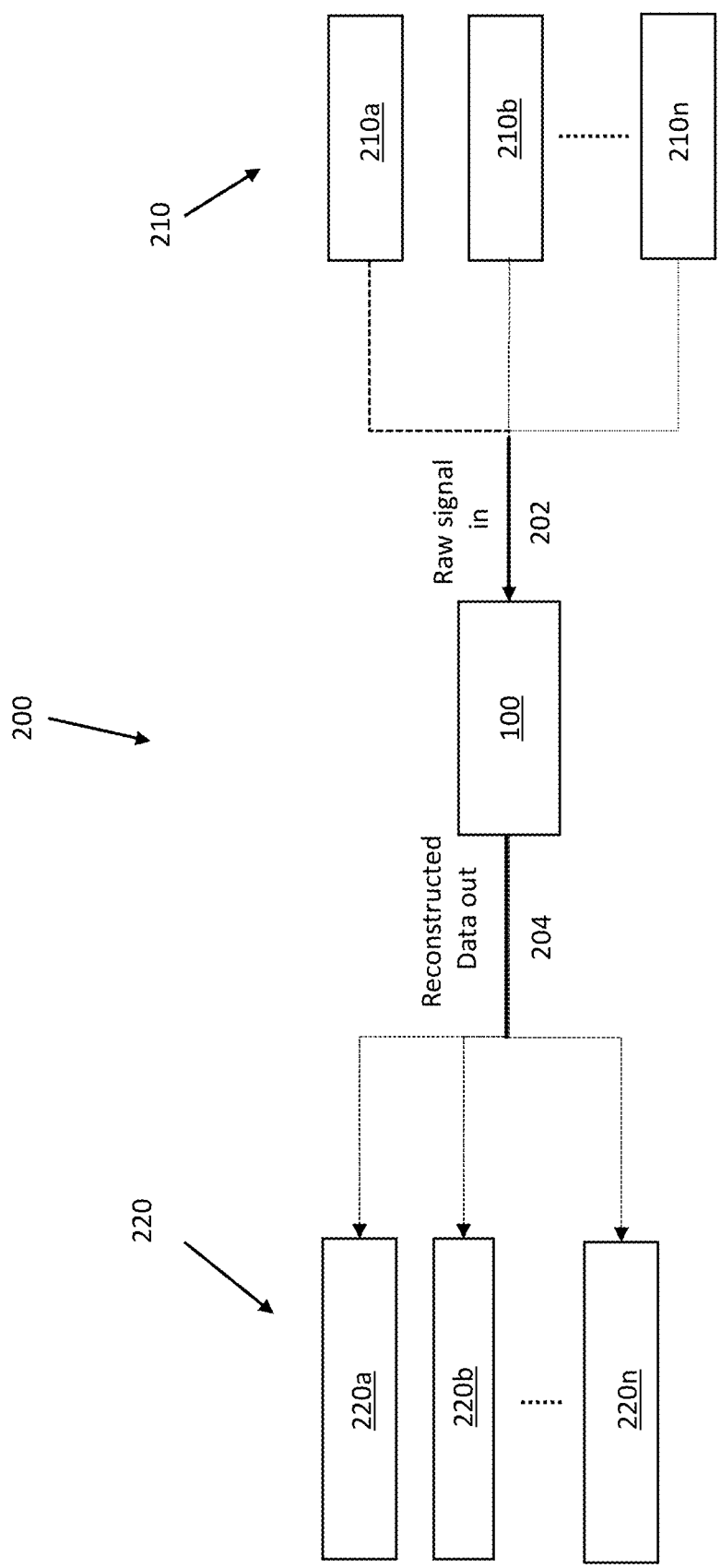
FIG. 2 illustrates an exemplary system incorporating aspects of the disclosed embodiments.

With reference also to FIG. 2, the apparatus 100 shown in FIG. 1 generally comprises an edge device, also referred to as a medical edge device. The apparatus 100 is generally configured to receive an input signal 202 from one of a plurality of different types of radiology scanner devices 210, such as a medical scanner or portable medical scanner. For purposes of this example, radiology scanner device 210a will be referred to. The input signal 202 generally comprises raw image data from the radiology scanner device 210a.

The aspects of the disclosed embodiments are not intended to be limited by the particular type of radiology or medical scanner device 210. The apparatus 100 is configured to act as a vendor neutral bridge between any medical imaging scanner device 210 and the post processing image device or software 220.

In one embodiment, the apparatus 100 is configured to detect a type of the radiology scanner device 210 to which it is connected. For example, in one embodiment, the type of radiology scanner device 210 can be a configuration setting. The required configuration parameters based on the type of radiology scanner device 210 in this example can be configured or set manually. In one embodiment, the configuration parameters can be established at the time of installation.

The apparatus 100 is configured to detect a type of one or more of the post processing image devices 220 on which the images obtained by the image scanning device 210a will be presented. In this example, post processing image 220b will be referred to.

The apparatus 100 is configured to provide reconstructed image data 204 that can be used by the particular type of post processing image device 220. In this example, the apparatus 100 is configured to take as an input the raw signal from the radiology scanner device 210a and, using a suitable image reconstruction protocol, provide a reconstructed data output signal configured for the specific post processing image device 220b. The image reconstruction protocol to be used can be determined based on the detected or otherwise determined post processing image device 220. The post processing image device 220b can then generate corresponding images based on the reconstructed output signal 204.

In the example of FIG. 2, the apparatus 100 is a standalone device and is generally considered or referred to as an edge device or medical edge device. The radiology scanner devices 210 and post processing image devices 220 can be part of a hospital infrastructure, medical facility, radiology facility or other similar healthcare environment, for example.

In one embodiment, the apparatus 100 generally comprises a combination of a hardware and software solutions in the form of a standalone network device. The apparatus 100 is generally configured to run reconstruction algorithms and utilize the on device resources to reconstruct the input signal 202 from a particular one of the radiology scanner devices 210 into images. The reconstructed data output signal 204 will be directed to the corresponding post processing image device 220.

In the example of FIG. 2, the radiology scanner device 210 can comprise any one of a number of different types 210a-210n of radiology scanner devices. The illustration of the different radiology scanner devices 210a-210n is merely to illustrate that the apparatus 100 can be connected to any one of a different number of types of radiology scanner devices, such as for example, a medical radiology scanner device, a portable radiology scanner device or magnetic resonance imaging (MRI) machines.

Similarly, the post processing image device 220 can comprises any one of a different number of types 220-220n of post processing image devices. Examples include, but are not limited to, a Radiology Information System (RIS), a Picture Archive and Communication System (PACS), an Image Reading System and a multi-modality workstation. The illustration of the different post processing image devices 220a-220n is merely to illustrate that the apparatus 100 is configured to be connected to any one of a different number of types of post processing image devices.

In a particular environment or setting, such as a hospital, the apparatus 100 is configured to be connected to and between one radiology scanner device 210 and one post processing image device 220. The apparatus 100 is configured to act as a vendor neutral bridge between the two devices 210, 220. The particular type 210a-210n of radiology scanner device 210 and the particular type 220a-220n of post processing imaging device 220 will depend upon the particular setting or implementation.

Examples of radiology scanner devices 210 can include, but are not limited to, tomography (CT), magnetic resonance (MR) imaging, and positron emission tomography (PET) image scanning devices. Examples of post processing imaging devices 220 can include, but are not limited to, a Radiology Information format supported by System (RIS), a Picture Archive and Communication System (PACS), an Image Reading System and a multi-modality workstation. In one embodiment, the radiology scanner device 210, and the post processing image device 220 can be part of the hospital environment or architecture. The apparatus 100 is configured to be interfaced between the radiology scanner device 210 and the post processing image device 220, without the need to adapt any of the hardware of the radiology scanner device 210 or the post processing image device 220.

The aspects of the disclosed embodiments are not intended to be limited to any particular combination of types 210*a*-210*n* of radiology scanner devices and types 220*a*-220*n* of post processing image devices. The apparatus 100 is configured to be employed in any particular or desired combination of types 210*a*-210*n* of radiology scanner devices and types 220*a*-220*n* of post processing image devices.

The apparatus 100 is configured to reconstruct the raw data input signals 202 from the connected radiology scanner device 210 into medical image signals 204, and is capable of reconstructing signals from CT, MR, PET machines into specific modality images. The apparatus 100 of the disclosed embodiments is vendor neutral and is configured to accept the raw data 202 and a reconstruction protocol from any type 210*a*-210*n* of radiology scanner device 210 and generate images specific to the modality.

In one embodiment the input signal 202 corresponds to a single slice or time series of the same slice from a corresponding radiology scanner device 210. The apparatus 100 is configured to reconstruct the input signal 202 and provide an output signal 204 that comprises for example, two-dimensional (2D) images.

In one embodiment, the apparatus 100 can include one or more of low end computation devices and high end computation devices. For example, the apparatus 100, or processor 102, can comprise a low end computation device with a low end general processing unit (GPU).

The apparatus 100 can also include a high end computation card. The ability to use low end and high end computation devices can lend the apparatus 100 to scalability, as will be further described herein.

In one embodiment, the apparatus 100 can include central processing unit (CPU) devices and deep learning (DL) devices. By being able to use only CPU type devices, the hardware costs of the apparatus 100 can be minimized.

In one embodiment, the apparatus 100 can be internally configured as a cluster on GPUs, CPUs, but exposed as a single device for external communication. In this manner, the apparatus 100 can be configured to linearly scale the performance of the reconstruction algorithm by merely inserting a "stick" into the pre-built reconstruction box, or black box.

In one embodiment, the apparatus 100 includes or comprises a pluggable or removable module, such as a circuit card or board. In this manner, the apparatus 100 can be easily upgraded by replacing or updating circuit cards to new or updated versions. Alternatively, or in addition to, the apparatus 100 is configured to be connected to or communicate over a network. In this manner, the image reconstruction algorithms that are stored in the apparatus 100 can be upgraded over the network rather than replacing cards. The combination of pluggable cards or modules and over the Internet upgrades enables an ease in adding additional or new hardware, as well as software updates.

In one embodiment, the apparatus 100 is configured to run a multitude of reconstruction services that are exposed via a standard interface to the connecting radiology scanner device 210. These interfaces, such as application programming interfaces (APIs), can include, but are not limited, representational state transfer (REST) interfaces, remote procedure calls (gRPC) or low-level message queues. The apparatus 100 can be configured to communicate with the radiology scanner device 210 and post processing image device 220 in a number of different ways.

In accordance with the aspects of the disclosed embodiment, the apparatus 100 is vendor neutral. This means that the apparatus 100 is configured to be connected to and communication with any type of radiology scanner device 210 and any type of post processing image device 220. The apparatus 100 can be configured to communicate using any suitable communication protocol or format, such as http protocol. In one embodiment, the communication protocol is a generic communication protocol.

The apparatus 100 is configured to accept the input data 202 from the radiology scanner device 210, which can include a particular image reconstruction protocol, and enable the post processing image device to generate images specific to the modality based on the reconstructed signal output from the apparatus 100. The apparatus 100 is not limited to a fixed modality.

The apparatus 100 can also be configured for different licensing or sale models. In one embodiment, the apparatus 100 can be configured as an "owned module", where the purchaser pays once for the apparatus 100. In an alternate embodiment, the apparatus 100 can be configured as a subscription service. In this example, for every patient data that is reconstructed, there is a charge.

Figure 3:
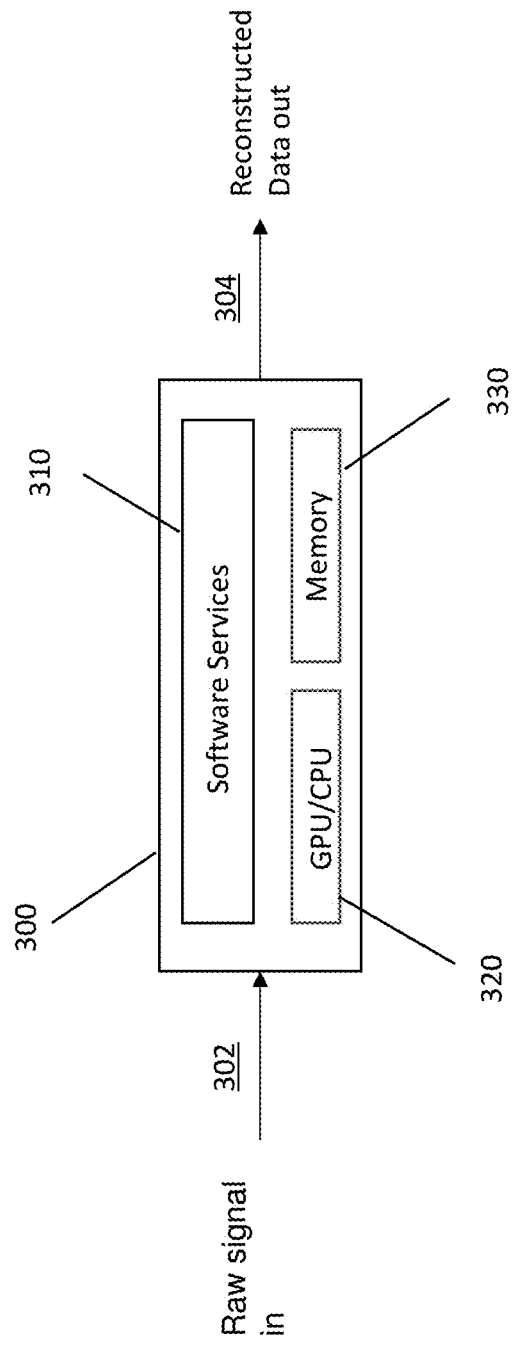
FIG. 3 illustrates an exemplary device incorporating aspects of the disclosed embodiments.

FIG. 3 illustrates an example of a device 300 incorporating aspects of the disclosed embodiments. In this example, the device 300, similar to the apparatus 100 of FIG. 1, is configured to receive as an input, raw signal data 302 from a radiology scanner device, such as radiology scanner device 210 of FIG. 2. The output 304 is a reconstructed data output signal. The output 304 will be reconstructed using a reconstruction protocol or algorithm that corresponds to the determined post processing image device 220.

In the example of FIG. 3, the device 300 can be described as a single edge device. The device 300 can include a software services module 310, a GPU/CPU processing module 320 as well as a memory module 330. In alternate embodiments, the device 300 can include other modules to enable the device 300 to interface between a radiology scanner device 210 and a post processing image device 220 as is generally described herein.

In one embodiment, the GPU/CPU module 320 of the device 300 can include low end hardware and high end hardware. Examples of low end hardware can include but is not limited to CPU based hardware devices by Intel Movidus™, and GPU based devices by Jetson Nano™, Tx2™ and Xavier™. Examples of high end hardware devices can include but are not limited to CPU based devices by i7™ and Xeon™ or GPU based devices by TitanXp™ and Tesla V100™. In one embodiment, the module 320 corresponds to, is included in or includes, the processor 102 of the apparatus 100 of FIG. 1.

Figure 4:
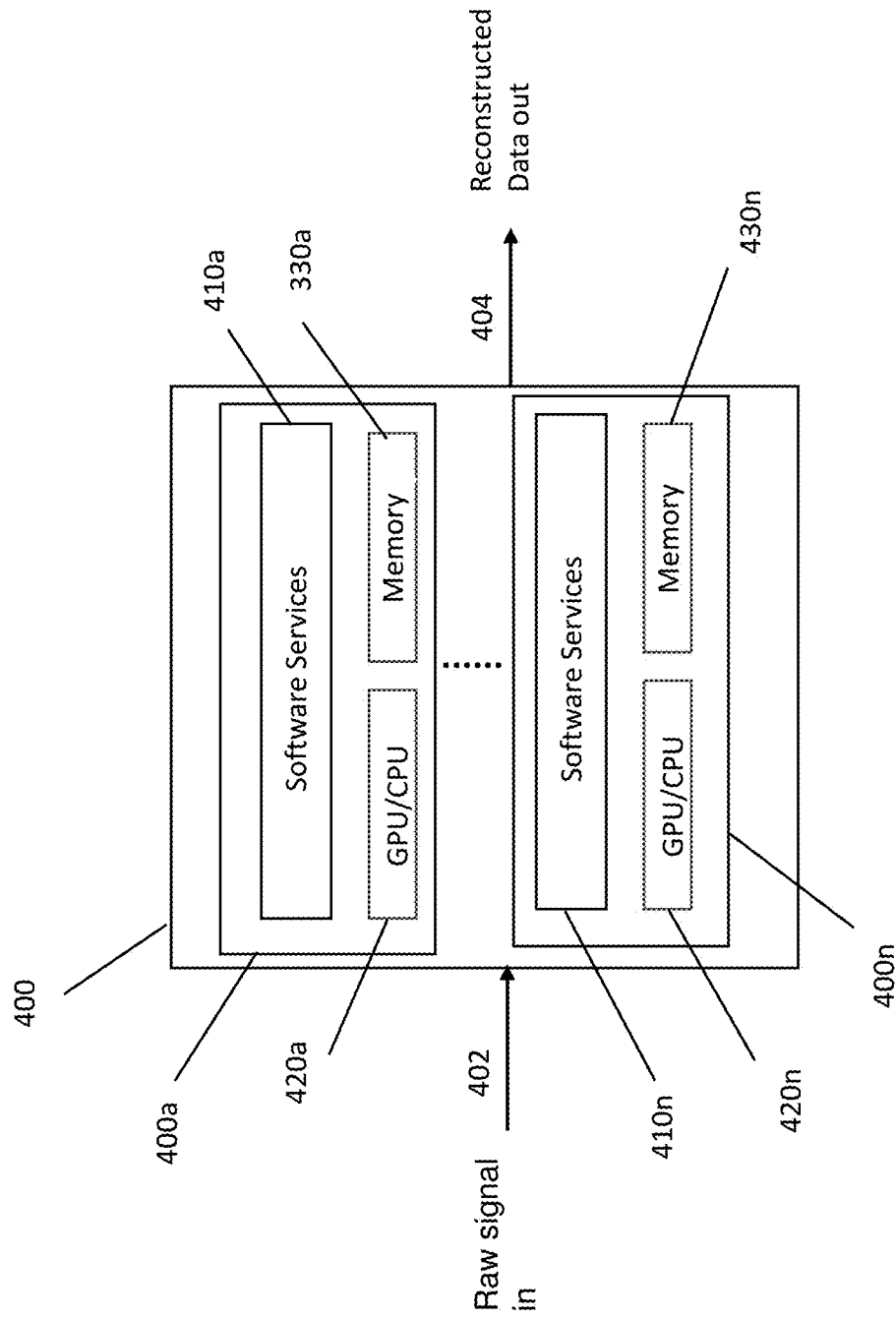
FIG. 4 illustrates an exemplary device incorporating aspects of the disclosed embodiments.

FIG. 4 illustrates an example of a device 400 incorporating aspects of the disclosed embodiments. In this example, the device 400, similar to the apparatus 100 of FIG. 1, is configured to receive as an input, raw signal data 402 from a radiology scanner device, such as radiology scanner device 210 of FIG. 2. The output 404 is the reconstructed data output signal.

In the example of FIG. 4, the device 400 can be described as a medical edge as cluster device. In this example, edge devices 400a-400n, similar to the device 300 from FIG. 3, are shown in a stacked arrangement to form a cluster. The device 400 can include one or more software services modules 410a-410n, GPU/CPU processing modules 420a-420n, as well as memory modules 430a-430n, in respective ones of the edge devices 400a-400n. The modules shown in FIG. 4 are the same as or similar to the similarly named modules shown in the other examples herein.

Figure 5:
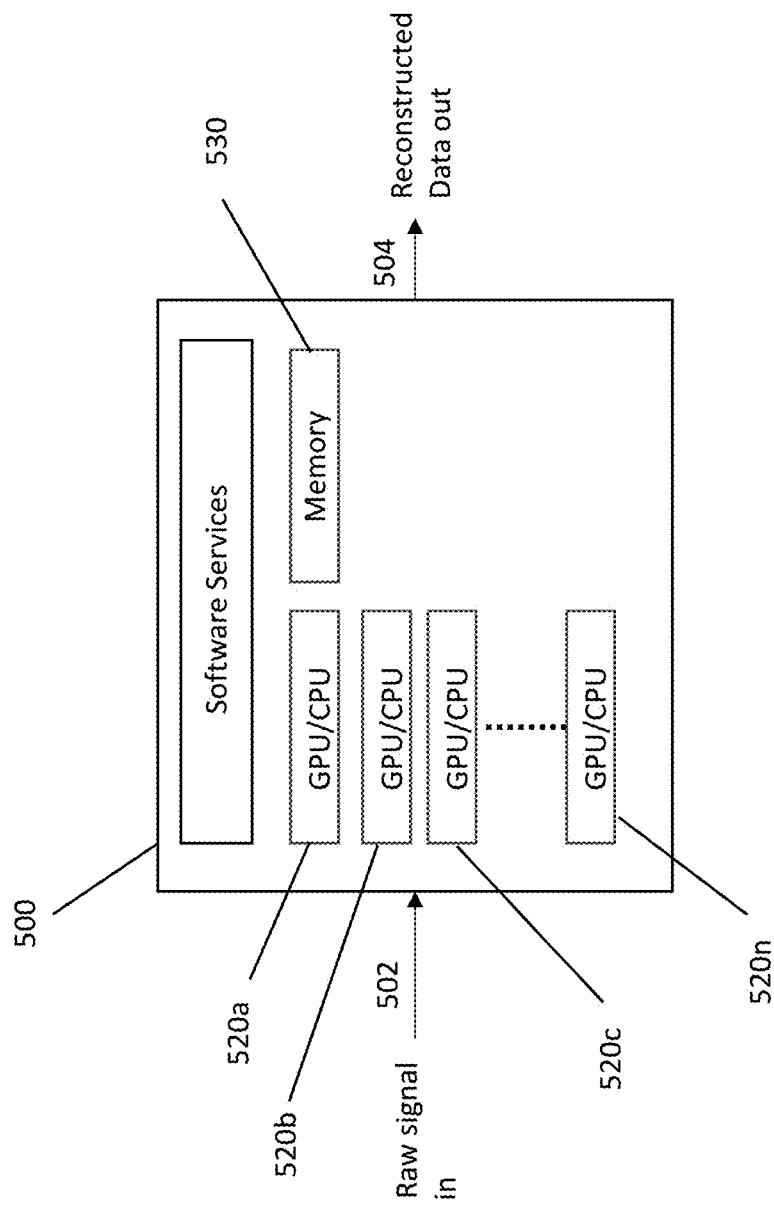
FIG. 5 illustrates an exemplary device incorporating aspects of the disclosed embodiments.

FIG. 5 illustrates an example of a device 500 incorporating aspects of the disclosed embodiments. In this example, the device 500, similar to the apparatus 100 of FIG. 1, is configured to receive as an input, raw signal data 502 from a radiology scanner device, such as radiology scanner device 210 of FIG. 2. The output 504 is the reconstructed data output signal.

In the example of FIG. 5, the device 500 can be described as a medical edge compute scalable device. The device 500 can include a software services module 510, GPU/CPU processing modules 520a, 520b-520n, as well as a memory module 530. The modules shown in FIG. 5 are the same as or similar to the similarly named modules shown in the other examples herein.

The device 500 of FIG. 5 allows scaling by adding additional CPU/GPU modules 320 of FIG. 3. Scaling can also be achieved by stacking the devices 500, such as shown in FIG. 4.

Figure 6:
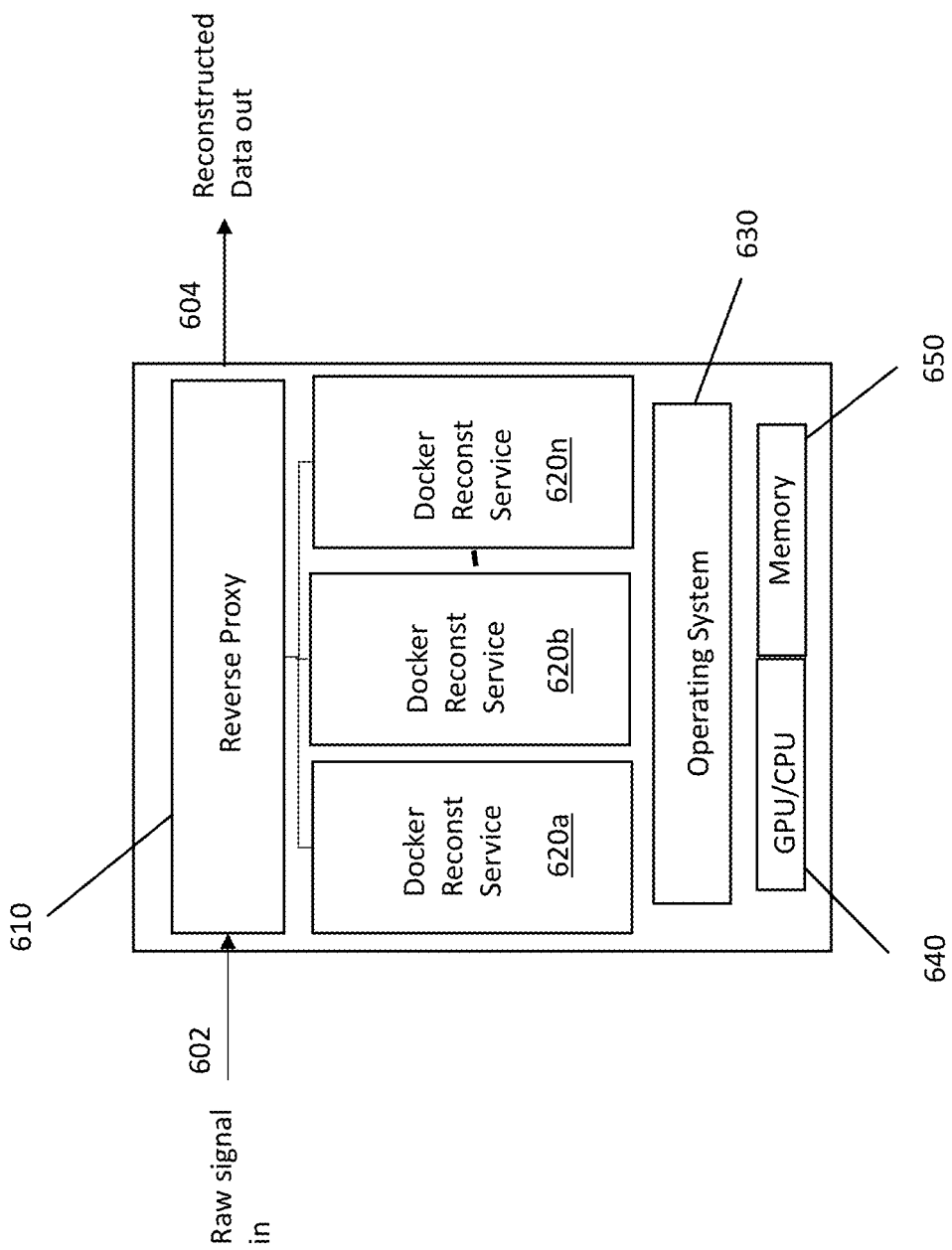
FIG. 6 illustrates an exemplary device incorporating aspects of the disclosed embodiments.

FIG. 6 illustrates another example of a device 600 incorporating aspects of the disclosed embodiments. In this example, the device 600, similar to the apparatus 100 of FIG. 1, is configured to receive as an input, raw signal data 602 from a radiology scanner device, such as radiology scanner device 210 of FIG. 2. The output 604 is the reconstructed data output signal. The device 600 can be described as a medical edge as a single device.

In this example, the edge device 600 is configured to host a plurality of Docker™ reconstruction services that perform reconstruction on the incoming data 602. As shown in FIG. 6, the device 600 includes a reverse proxy module 610, a plurality of Docker™ reconstruction services modules 620a-620n, an operating system module 630, GPU/CPU module 640 and memory module 650. The modules shown in FIG. 6 are the same as or similar to the similarly named modules shown in the other examples herein.

Figure 7:
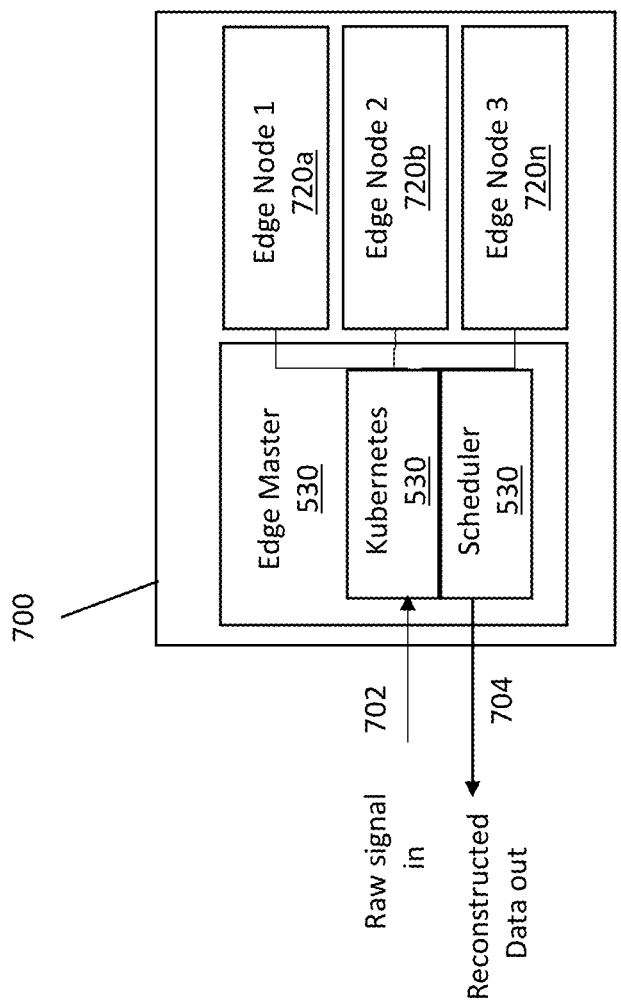
FIG. 7 illustrates an exemplary device incorporating aspects of the disclosed embodiments.

FIG. 7 illustrates another example of a device 700 incorporating aspects of the disclosed embodiments. In this example, the device 700, similar to the apparatus 100 of FIG. 1, is configured to receive as an input, raw signal data 702 from a radiology scanner device, such as radiology scanner device 210 of FIG. 2. The output 704 is the reconstructed data output signal. The device 700 can be described as a medical edge cluster device.

The device 700 can include an edge master device 710 that is connected to a plurality of connected edge node devices 720a-720n. In this example, the connected edge node devices 720a-720n will be managed using, for example, Kubernetes™ cluster management software and a custom scheduler 730 that allows the performance of the cluster to linearly scale.

Figure 8:
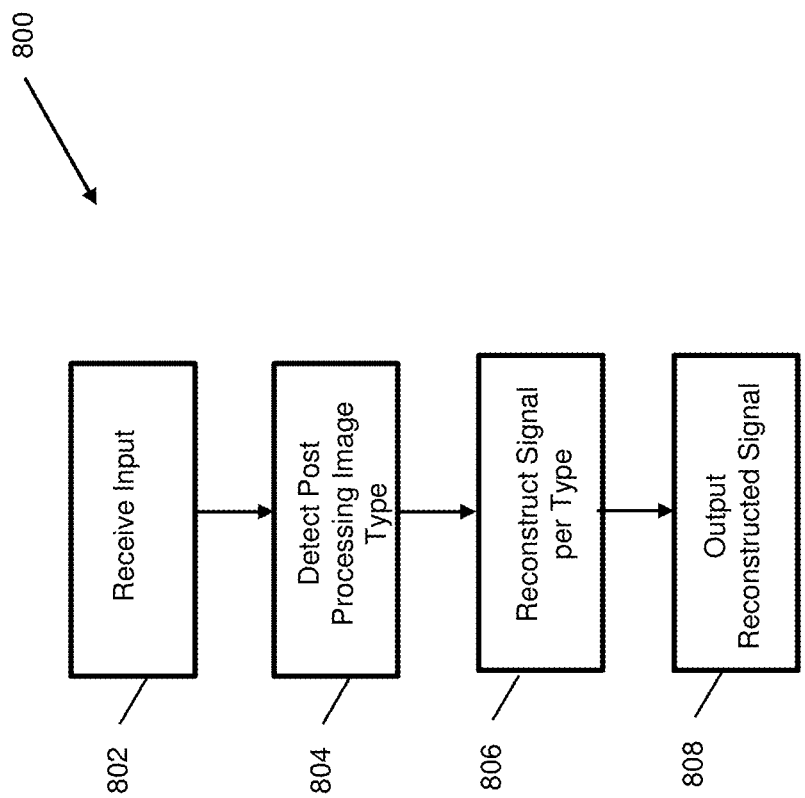
FIG. 8 illustrates an exemplary method incorporating aspects of the disclosed embodiments.

FIG. 8 illustrates an exemplary method incorporating aspects of the disclosed embodiments. In this example, the method includes receiving 802 an input signal from a radiology scanner device, detecting 804 a type of a post processing imaging device connected to the apparatus, reconstructing 806 the input signal from the radiology scanner device into a format corresponding to the detected type of post processing imaging device and outputting 808 the reconstructed input signal to the post processing imaging device. The aspects of the disclosed embodiments provide a stand-alone, self-contained, edge device that can be used to reconstruct raw radiology image data from any radiology scanner device into a reconstructed output signal that corresponds to a type of post processing image device that is connected to the edge device. The edge device of the disclosed embodiments is a pre-built reconstruction device that can be readily integrated to and between any radiology scanner device and a post processing image device.

The aspects of the disclosed embodiments are directed to an image reconstruction device that is configured to reconstruct the raw signals received from an radiology scanning device into an output signal. The reconstructed output signal is a user readable domain that can be used by a post processing image device to generate medical images or volumes. The image reconstruction device of the disclosed embodiments is a prebuilt image signal reconstruction box that can be readily integrated with different types of radiology scanner devices as well as post processing image devices.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An apparatus comprising at least one processor, the at least one processor being configured to:
receive an input signal from a radiology scanner device, the input signal comprising a raw image data signal;
detect a type of a post processing imaging device connected to the apparatus and a first format corresponding to the detected type of post processing imaging device, the post processing imaging device being configured to generate a medical image or a three-dimensional (3D) volume in a second format corresponding to one or more of a Radiology Information format supported by System (RIS), a Picture Archive and Communication System (PACS), an Image Reading System and a multi-modality workstation;
reconstruct the input signal from the radiology scanner device into the first format corresponding to the detected type of post processing imaging device, the reconstructed output signal comprising one or more two dimensional image signals reconstructed from the input signal; and output the reconstructed input signal to the post processing imaging device to enable the post processing imaging device to generate the medical image or the three-dimensional (3D) volume.

2. The apparatus according to claim 1, wherein the apparatus comprises a stand-alone device removably coupled between the radiology scanner device and the post processing imaging device.

3. The apparatus according to claim 2 wherein the input signal received from the radiology scanner device corresponds to a single slice signal or a time series of a same slice signal and the reconstructed output signal comprises one or more two dimensional image signals reconstructed from the input signal.

4. The apparatus according to claim 2, wherein the apparatus is a self contained edge device.

5. The apparatus according to claim 2, wherein the at least one processor is configured to convert the input signal from the radiology scanner device into a user readable domain using a reconstruction protocol corresponding to the determined type of post processing imaging device.

6. The apparatus according to claim 2, wherein the at least one processor is further configured to determine an image reconstruction protocol from the detected type of post processing imaging device.

7. The apparatus according to claim 2, wherein the at least one processor forms a processor module and the apparatus is scalable by stacking one or more processor modules into a cluster.

8. The apparatus according to claim 2, wherein the apparatus is configured to be connected to a portable radiology scanner as the radiology scanner device.

9. The apparatus according to claim 2 wherein the radiology scanner device is one or more of a computed tomography (CT), magnetic resonance (MR) imaging, and positron emission tomography (PET) image scanning device, XRay scanning device.

10. The apparatus according to claim 1 wherein a type of the radiology scanner device is different from the type of the post processing imaging device.

11. A method of image reconstruction in an apparatus comprising at least one processor configured to execute non-transitory machine readable instructions, wherein the method includes execution of the machine readable instruction by the at least one processor to:
receive an input signal from a radiology scanner device, the input signal comprising a raw image data signal;
detect a type of a post processing imaging device connected to the apparatus and a first format corresponding to the detected type of post processing imaging device, the post processing imaging device being configured to generate a medical image or a three-dimensional (3D) volume in a second format corresponding to one or more of a Radiology Information format supported by System (RIS), a Picture Archive and Communication System (PACS), an Image Reading System and a multi-modality workstation;
reconstruct the input signal from the radiology scanner device into the first format corresponding to the detected type of post processing imaging device, the reconstructed output signal comprising one or more two dimensional image signals reconstructed from the input signal; and
output the reconstructed input signal to the post processing imaging device to enable the post processing imaging device to generate the medical image or the three-dimensional (3D) volume.

12. The method according to claim 11, wherein the apparatus comprises a stand-alone device removably coupled between the radiology scanner device and the post processing imaging device.

13. The method according to claim 12 wherein the input signal received from the radiology scanner device corresponds to a single slice signal or a time series of a same slice signal and the reconstructed output signal comprises one or more two dimensional image signals reconstructed from the input signal.

14. The method according to claim 12, wherein the apparatus is a self contained edge device.

15. The method according to claim 12, wherein the method further includes execution of the non-transitory machine readable instructions by the at least one processor to convert the input signal from the radiology scanner device into a user readable domain using a reconstruction protocol corresponding to the determined type of post processing imaging device.

16. The method according to claim 12, wherein the method further includes execution of the non-transitory machine readable instructions by the at least one processor to determine an image reconstruction protocol from the detected type of post processing imaging device.

17. The method according to claim 12, wherein the method further comprises forming a processor module from the at least one processor and stacking one or more processor modules into a cluster.

18. The method according to claim 12, wherein the radiology scanner device is one or more of a computed tomography (CT), magnetic resonance (MR) imaging, and positron emission tomography (PET) image scanning device, XRay scanning device.

19. The method according to claim 11 wherein a type of the radiology scanner device is different from the type of the post processing imaging device.

20. A computer program product comprising a non-transitory computer readable media having stored thereon program instructions that when executed by a processor causes the processor to perform the method according to claim 11.

* * * * *